July 21, 1942.  R. D. YOUNG  2,290,461
AUTOMATIC SHUT-OFF VALVE
Filed June 8, 1940
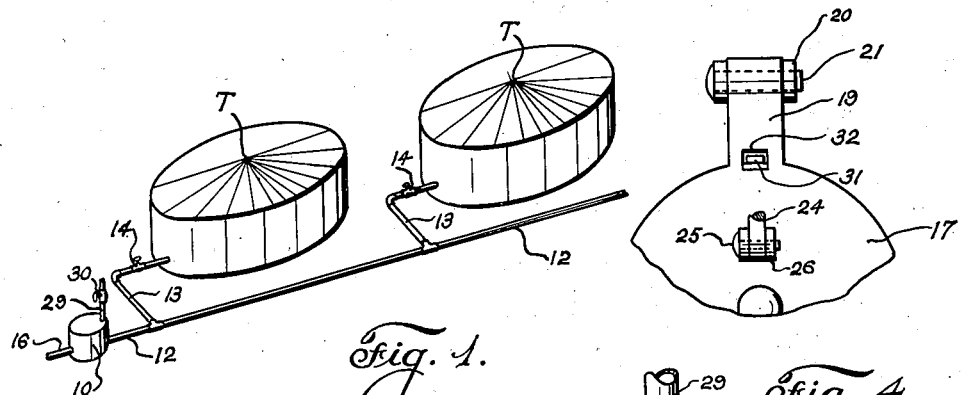
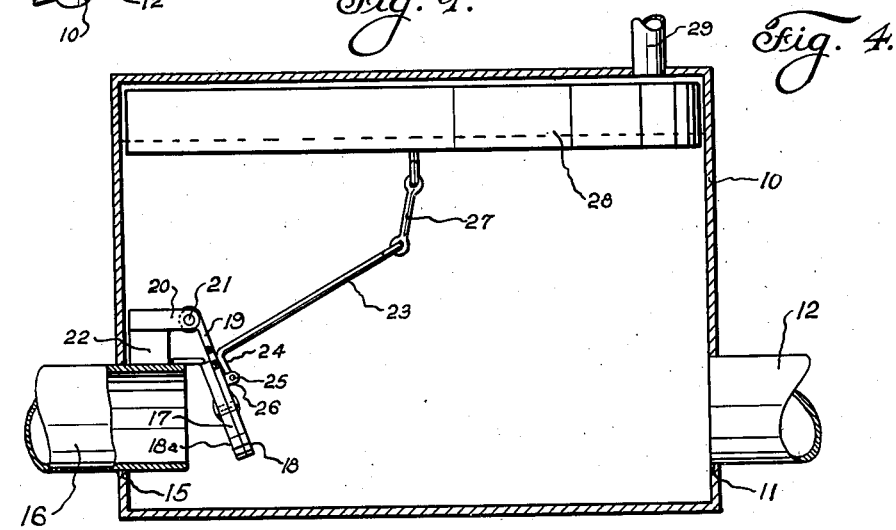
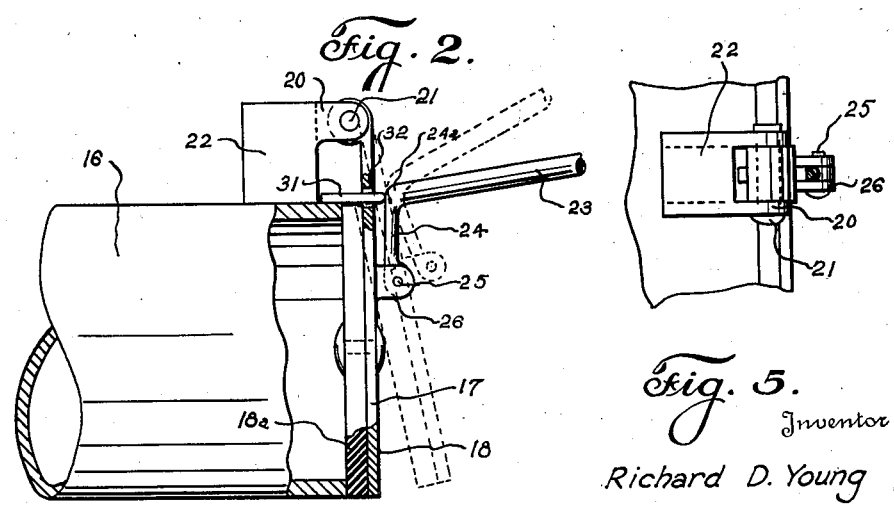
Inventor
Richard D. Young
By Jack A. Ashley
Attorney Patented July 21, 1942

2,290,461

UNITED STATES PATENT OFFICE 2,290,461

AUTOMATIC SHUTOFF VALVE

Richard D. Young, Longview, Tex.

Application June 8, 1940, Serial No. 339,477

10 Claims. (Cl. 137—68)

This invention relates to new and useful improvements in automatic shut-off valves.

One object of the invention is to provide an improved shut-off valve for tanks, or other liquid vessels, which is mounted in the discharge line and which is arranged to automatically close the line when the liquid level falls to a predetermined point, whereby the entrance of air into said line is prevented; the device being particularly adapted for use with a battery of tanks, and permitting the emptying of all of the tanks through a common discharge with a single pump without danger of excessive air entering said discharge line.

An important object of the invention is to provide an improved shut-off valve wherein a float is connected to the valve element to control the movement thereof in accordance with the liquid level; the connection between the float and valve element being such that upon initial upward movement of the float, the force exerted upon the valve is amplified to assure breaking of the vacuum seal and unseating of the valve, after which said force is decreased since it is unnecessary after the vacuum is overcome, such arrangement making for positive operation of the valve element and providing more efficient control.

Another object of the invention is to provide an improved shut-off valve, wherein an angular operating rod which is float-controlled, is directly connected to the valve element, together with a fixed member which is arranged to co-act with the angular operating rod upon initial opening movement of the valve element to provide an amplified or increased leverage at initial opening movement of the valve to overcome the suction tending to hold the valve closed, whereby opening of the valve is assured; the fixed member becoming inactive aften the valve element has opened, whereby completion of the opening movement is accomplished through the direct connection between the rod and valve.

Still another object of the invention is to provide an improved device, of the character described, which is simple in construction and economical in manufacture and which is so constructed that the amplified leverage at initial opening movement is obtained with a minimum number of parts, said parts requiring no adjustment and being arranged so that they are not subject to excessive wear.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is an elevation of a shut-off valve, constructed in accordance with the invention, and showing the same connected in the discharge line of a battery of storage tanks, Figure 2 is an enlarged, transverse vertical, sectional view of the device, with the valve element in its fully opened position, Figure 3 is an enlarged, transverse, vertical, sectional view of the valve element in its closed position, Figure 4 is a partial face view of the valve element, and Figure 5 is a partial plan view of the liquid outlet illustrating the mounting of the valve element.

In the drawing, the numeral 10 designates a casing or housing, which is shown as cylindrical in cross-section, although it may be of any desired shape and size. The casing 10 is constructed of metal or other suitable material and the side wall of said casing is provided with an opening 11 which is located near the bottom of the casing. One end of an elongate discharge line 12 is connected in the opening 11 and said line extends contiguous to a plurality of tanks T, which may be arranged in a battery in the usual manner. Each tank has the discharge opening at the lower end thereof connected to the common discharge line 12 through a T-connection 13 and each connection is provided with a manually controlled valve 14, whereby the flow from each tank into the common discharge line 12 may be controlled. With this arrangement, it will be manifest that the liquid from any one of the tanks in the battery may be conducted into the common discharge line 12, from where said liquid flows into the casing 10.

Diametrically opposite the opening 11 in which the end of the discharge line 12 is connected, is another opening 15 and this opening has one end of an outlet pipe 16 extending therethrough, whereby the inner end of the discharge pipe is disposed within the interior of the casing 10. The pipe may be welded, or otherwise secured within the opening 15. The outlet pipe 16 is connected with a suitable pump (not shown) whereby the liquid from the interior of the casing 10 and also from the common discharge line 12 may be drawn therefrom. In this manner, any one, or all of the tanks T may be emptied of their contents, the liquid flowing from the tanks into the discharge line 12, then through the casing 10 and finally out through the outlet pipe 16.

Since a suction pump is employed for pumping the liquid from the line 12 and through the casing 10, it is manifest that if there is no liquid within the line 12 and no liquid within a particular tank which may have been emptied, then air would be drawn into the outlet pipe 16 and then into the pumping mechanism. The presence of air within the pipe 16 or within the pumping mechanism is very undesirable and will interfere with the pumping apparatus. Thus, it becomes necessary to close the end of the outlet pipe 16 whenever the liquid within the casing 10 falls to a predetermined level, whereby air cannot enter said pipe.

In order to close the pipe 16 whenever the liquid level within the casing falls below a predetermined point, a cylindrical valve element 17 is arranged to seat on the end of said pipe. This valve element includes a circular disk 18 which is provided with an integral upwardly extending arm 19. The arm 19 has its upper end disposed between ears 20 and is pivotally secured to said ears by means of a pivot pin 21. The ears 20 are former at the upper end of a supporting block 22, which block is secured to the upper end of the pipe 16, said block being located within the interior of the casing, as is clearly shown in Figure 2. With this arrangement, it will be obvious that the valve element 17 forms a slat valve which is adapted to swing into a position overlying the end of the outlet pipe 16. The metallic disk 18 of the valve element 17 has a packing disk 18a, which is constructed of leather, rubber or other flexible material, secured to its inner surface and when the valve is swung to a closed position, as shown in Figure 3, the flexible disk engages the edge of the outlet pipe 16 to seal the bore of the pipe.

When the valve element 17 is swung to a closed position, communication between the interior of the casing 10 and the outlet pipe 16 is shut off; similarly, when the valve element 17 is swung outwardly, as illustrated in dotted lines in Figure 3 and in full lines in Figure 2, a flow of liquid from the interior of the casing 10 and into the pipe 16 may occur.

For controlling the opening and closing of the valve element 17, an operating rod 23 is provided. This rod has one end bent at substantially a right angle to form a leg 24 and this leg has its end pivoted on a pin 25 to outwardly extending lugs 26 which are formed on the outer surface of the metallic disk 18 of the valve element. Obviously, due to the pivot point of the leg 24 the inner surface of said leg extends contiguous to the outer surface of the metallic disk 18 of the valve element and when the leg is swung inwardly toward the disk, the angle 24a formed between the leg and the rod 23 engages the outer surface of the disk and also the outer surface of the upwardly extending arm 19 formed integral with said disk.

The outer end of the rod 23 is connected by means of a link 27 with a float 28, which float is disposed within the interior of the casing 10. The position of the float 28 within the casing 10 is controlled by the liquid level within said casing and as said level rises and falls, the float 28 is moved vertically within the casing. As said float moves upwardly and downwardly within the casing, the valve element 17 is opened and closed, as will be explained. For venting the air from the upper end of the casing 10, as the float rises upwardly therein, a suitable vent pipe 29 is provided. This pipe is connected in the top of the casing 10 and extends upwardly therefrom. A suitable manually control valve 30 may, if desired, be connected in the vent pipe 29.

When the valve element 17 is in its closed position (Figure 3) the suction which is present within the outlet pipe 16 is acting on the valve to hold the valve in its closed position. When opening of the valve is necessary, this suction must be overcome in addition to the weight of the valve. In order to assure opening of the valve element 17 upon initial upward movement of the float 28, the operating rod 23 and its leg 24 are adapted to co-act with an outwardly extending finger or bar 31, which finger is secured to the top of the outlet pipe 16 at the extreme inner end thereof. As is clearly shown in Figures 2 to 4, the finger 31 is disposed immediately below the ears 20 and extends some distance beyond the inner edge of the pipe 16. When the valve is closed, the finger 31 extends through an opening 32 which is provided in the lower portion of the upwardly extending arm 19 of the valve element. The outer end of the finger 31 is adapted to engage the angular portion of the rod 23, as shown in Figure 3, whereby when the valve is closed, the leg 24 of the rod 23 is held outwardly away from the outer surface of the valve disk 18.

In the operation of the device, assuming the float 28 to be in a lowered position, the valve element 17 will be in the position shown in full lines in Figure 3, with the operating rod 23 extending more or less in a horizontal plane. At this time, the angular portion 24a of the rod 23 is engaging the finger 31 which is fixed to the pipe 16 and the leg 24 is spaced from the outer surface of the valve disk 18. Of course, at this time, the liquid level is at a relatively low point within the casing 10 and the suction within the outlet pipe 16 is aiding in holding the valve element in its closed position.

As the liquid level rises within the casing 10, the float 28 moves upwardly within said casing and such upward movement of the float will result in an upward swinging of the outer end of the rod 23. As the outer end of the rod 23 swings upwardly, a fulcrum point is formed at the contacting surfaces of the finger 31 and the angular portion 24a of said rod, with the result that the lower end of the leg 24 which is pivoted to the valve disk is moved outwardly, to the position shown in dotted lines in Figure 3. Since the finger 31 acts as a fulcrum point, an amplified leverage is obtained, whereby an increased force is applied to the valve element 17 so as to move the same outwardly upon initial upward movement of the float 28. This increased force assures that the valve element will be moved away from the edge of the outlet pipe 16 against the vacuum within the bore of said pipe.

As the float continues its upward movement, the valve disk swings outwardly to the position shown in dotted lines in Figure 3, whereby the outer surface of the metallic disk 18 of the valve element moves outwardly beyond the end of the finger 31. When this occurs, the rod 23 is permitted to undergo an additional swinging movement with relation to the outer surface of the valve disk 18, whereby the angular portion 24a moves into engagement with the outer surface of said disk, as is clearly shown in Figure 2. From this point on, continued upward movement of the float transmits a continued outward swinging to the valve element 17, such swinging being accomplished through the direct connection between the rod 23, leg 24 and pivot pin 25. So long as a liquid level is maintained within the casing, the float holds the valve element 17 in an open position and permits a flow of liquid into the outlet pipe 16. Of course, whenever the liquid level within the casing 10 falls to a predetermined point, the float is lowered sufficiently to permit the valve element 17 to again seat and close the outlet pipe 16.

From the above, it will be seen that a very simple and efficient shut-off device, which is automatic in its operation, is provided. The coaction between the operating rod 23 and the fixed finger or bar 31 upon the initial upward movement of the float 28 provides for an amplified leverage which causes an increased force to be exerted upon the valve element 17. This increased force assures that the valve 17 will be positively opened against the suction within the outlet pipe 16. After the seal, caused by the vacuum within the pipe 16, is broken, the connection between the float and the valve element 17 is converted into a direct connection through the rod 23, leg 24 and pivot pin 25. Therefore, at the time that the increased force is needed, it is supplied but after the valve has opened to a predetermined point, continued movement thereof is accomplished through a direct connection. The device comprises a minimum number of parts and after installaiton, requires no adjustment. Although a particular type of valve element 17 has been illustrated, which employs a metallic disk 18 in combination with a flexible disk 19, the invention is not to be limited to this particular arrangement, as any suitable slat valve may be employed.

The foregoing description of the invention is explanatory thereof and various changes in the size, shape and materials as well as in the details of the illustrated construction may be made, within the scope of the appended claims, without departing from the spirit of the invention.

What I claim and desire to secure by Letters Patent is:

1. An automatic control valve including, a casing having a liquid inlet and a liquid outlet, a pivoted flap valve adapted to swing over the outlet for controlling the flow of liquid therethrough, a float within the casing, an angular connection pivotally connected to the flap valve and also to the float whereby said float controls the opening and closing of the valve, and means co-acting with the angular portion of said connection upon initial upward movement of the float to amplify the applied force upon initial movement of the float to assure opening of the valve, said angular portion extending contiguous to said valve and positively engaging the same after initial opening movement of the valve to complete the opening thereof.

2. An automatic control valve including, a casing having a liquid inlet and a liquid outlet, a pivoted flap valve adapted to swing over the outlet for controlling the flow of liquid therethrough, a float within the casing, an angular connection pivotally connected to the flap valve and also to the float whereby said float controls the opening and closing of the valve, and stationary means mounted adjacent the valve and coacting with the angular portion of the connection for amplifying the applied force upon initial upward movement of the float to assure opening of the valve, said angular portion extending contiguous to said valve and positively engaging the same after initial opening movement of the valve to complete the opening thereof.

3. An automatic control valve including, a casing having a liquid inlet and a liquid outlet, a pivoted flap valve adapted to swing over the outlet for controlling the flow of liquid therethrough, a float within the casing, an angular operating rod having one end pivotally connected with the flap valve and its other end connected to the float, whereby said float controls the opening and closing of the valve, and means coacting with the angular portion of the rod upon initial upward movement of the float to amplify the applied force and assure opening of the valve, said angular portion extending contiguous to said valve and positively engaging the same after initial opening movement of the valve to complete the opening thereof.

4. An automatic control valve including, a casing having a liquid inlet and a liquid outlet, a pivoted flap valve adapted to swing over the outlet for controlling the flow of liquid therethrough, a float within the casing, an operating member which comprises an elongate operating rod having an angular leg at one end thereof, means for connecting the end of the rod to the float, means for pivotally securing the extremity to the outer surface of the valve so that the leg extends contiguous to the surface of the valve, and a fixed means adjacent the valve for engaging the leg when the valve is in a closed position, whereby upon initial upward movement of the float and rod the fixed means acts as a fulcrum point for the leg to amplify the applied force and assure opening of the valve.

5. An automatic control valve including, a casing having a liquid inlet and a liquid outlet, a pivoted flap valve adapted to swing over the outlet for controlling the flow of liquid therethrough, a float within the casing, an operating member which comprises an elongate operating rod having an angular leg at one end thereof, means for connecting the end of the rod to the float, means for pivotally securing the extremity to the outer surface of the valve so that the leg extends contiguous to the surface of the valve, and a fixed means adjacent the valve for engaging the leg when the valve is in a closed position, whereby upon initial upward movement of the float and rod the fixed means acts as a fulcrum point for the leg to amplify the applied force and assure opening of the valve, said leg moving away from the fixed means and engaging the outer surface of the valve after the valve has been opened a predetermined distance, whereby completion of the opening of the valve is accomplished through the direct connection between the float and valve.

6. An automatic control valve including, a casing having a liquid inlet, an outlet pipe extending through the wall of the casing and having its inner open end disposed within the casing, a flap valve adapted to engage the inner edge of the outlet pipe to close the same, means secured to the pipe for pivotally supporting the valve so that said valve may be swung to various positions to control the flow through the pipe, a float within the casing, a connection between the float and valve whereby the float controls the movement of the valve, and fixed means secured to the end of the pipe and extending beyond the valve for co-acting with the connection to amplify the applied force upon initial upward movement of the float and thereby assure opening of the valve, said connection having a portion extending contiguous to said valve and positively engaging the same after initial opening movement of the valve, whereby completion of the opening of said valve is accomplished through the direct connection between the float and valve.

7. An automatic control valve including, a casing having a liquid inlet, an outlet pipe extending through the wall of the casing and having its inner open end disposed within the casing, a flap valve adapted to engage the inner edge of the outlet pipe to close the same, means secured to the pipe for pivotally supporting the valve so that said valve may be swung to various positions to control the flow through the pipe, a float within the casing, an operating member which comprises an elongate operating rod having an angular leg at one end thereof, means for connecting the end of the rod to the float, means for pivotally securing the extremity to the outer surface of the valve so that the leg extends contiguous to the surface of the valve, and a fixed means adjacent the valve for engaging the leg when the valve is in a closed position, whereby upon initial upward movement of the float and rod the fixed means acts as a fulcrum point for the leg to amplify the applied force and assure opening of the valve.

8. An automatic control valve including, a casing having a liquid inlet, an outlet pipe extending through the wall of the casing and having its inner open end disposed within the casing, a flap valve adapted to engage the inner edge of the outlet pipe to close the same, means secured to the pipe for pivotally supporting the valve so that said valve may be swung to various positions to control the flow through the pipe, a float within the casing, an operating member which comprises an elongate operating rod having an angular leg at one end thereof, means for connecting the end of the rod to the float, means for pivotally securing the extremity to the outer surface of the valve so that the leg extends contiguous to the surface of the valve, and a fixed means adjacent the valve for engaging the leg when the valve is in a closed position, whereby upon initial upward movement of the float and rod the fixed means acts as a fulcrum point for the leg to amplify the applied force and assure opening of the valve, said leg moving away from the fixed means and engaging the outer surface of the valve after the valve has been opened a predetermined distance, whereby completion of the opening of the valve is accomplished through the direct connection between the float and valve.

9. An automatic control valve including, a casing having a liquid inlet and a liquid outlet, a pivoted flap valve adapted to swing over the outlet for controlling the flow of liquid therethrough, a float within the casing, an operating rod having one end connected to the float, a member depending from the other end of the rod and pivotally secured to the valve, the member extending at an angle to said rod and contiguous to the outer surface of said valve, and means for engaging said member when the valve is in a closed position, whereby upon initial upward movement of the float and rod the means acts as a fulcrum point for the member to amplify the applied force and assure opening of said valve.

10. An automatic control valve including, a casing having a liquid inlet and a liquid outlet, a pivoted flap valve adapted to swing over the outlet for controlling the flow of liquid therethrough, a float within the casing, an operating rod having one end connected to the float, a member depending from the other end of the rod and pivotally secured to the valve, the member extending at an angle to said rod and contiguous to the outer surface of said valve, and means for engaging said member when the valve is in a closed position, whereby upon initial upward movement of the float and rod the means acts as a fulcrum point for the member to amplify the applied force and assure opening of said valve, said member moving away from said means and engaging the outer surface of the valve after said valve has been opened a predetermined clearance, whereby completion of the opening of the valve is accomplished through the direct connection between the float and valve.

RICHARD D. YOUNG.